(12) United States Patent
Hsu et al.

(10) Patent No.: US 8,915,634 B2
(45) Date of Patent: Dec. 23, 2014

(54) PLANE LIGHT SOURCE AND FLEXIBLE PLANE LIGHT SOURCE

(75) Inventors: Chao-Kai Hsu, Hsinchu County (TW); Yu-Hua Chen, Nantou County (TW); Wei-Chung Lo, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 4 days.

(21) Appl. No.: 13/590,202

(22) Filed: Aug. 21, 2012

(65) Prior Publication Data

US 2013/0128610 A1 May 23, 2013

Related U.S. Application Data

(60) Provisional application No. 61/563,502, filed on Nov. 23, 2011.

(30) Foreign Application Priority Data

Apr. 19, 2012 (TW) ............................. 101113996 A

(51) Int. Cl.

| F21V 7/04 | (2006.01) |
| F21V 13/04 | (2006.01) |
| F21S 2/00 | (2006.01) |
| F21V 5/00 | (2006.01) |
| F21Y 105/00 | (2006.01) |
| F21Y 101/02 | (2006.01) |

(52) U.S. Cl.
CPC ................. *F21V 5/002* (2013.01); *F21V 13/04* (2013.01); *F21S 2/00* (2013.01); *F21Y 2105/00* (2013.01); *F21Y 2101/02* (2013.01)
USPC ........... 362/606; 362/613; 362/617; 362/634; 362/97.1; 345/102; 345/690

(58) Field of Classification Search
USPC ......... 362/606, 613, 617, 634, 97.1; 345/102, 345/690
See application file for complete search history.

(56) References Cited

U.S. PATENT DOCUMENTS 6,669,350 B2 12/2003 Yamashita et al.
7,108,416 B1 9/2006 Osawa
(Continued)

FOREIGN PATENT DOCUMENTS

| CN | 1588201 | 3/2005 |
| CN | 101809474 | 8/2010 |

(Continued)

OTHER PUBLICATIONS

Chae et al., "Concave Micropatterned Complex Optical Surfaces for Wide Angular Illumination", Transducers, Jun. 21-25, 2009, pp. 2078~2081.

(Continued)

*Primary Examiner* — Thomas A Hollweg
(74) *Attorney, Agent, or Firm* — Jianq Chyun IP Office

(57) ABSTRACT

A plane light source including a circuit substrate, a plurality of sets of side-view light-emitting devices (LEDs), and a diffusive light-guiding layer is provided. The side-view LEDs are arranged in array over the circuit substrate and are electrically connected with the circuit substrate. The diffusive light-guiding layer covers the side-view LEDs, wherein the diffusive light-guiding layer includes a plurality of diffusive light-guiding units arranged in array and connected to each other. Each of the diffusive light-guiding units is respectively corresponded to illumination coverage of one set of side-view LEDs. Each set of side-view LEDs at least includes two side-view LEDs for emitting light respectively along two different directions and towards into one single diffusive light-guiding units.

23 Claims, 7 Drawing Sheets

(56) References Cited

U.S. PATENT DOCUMENTS

| | | | |
|---|---|---|---|
| 7,188,988 B2* | 3/2007 | Koganezawa | 362/616 |
| 7,273,291 B2 | 9/2007 | Kim et al. | |
| 7,400,439 B2 | 7/2008 | Holman | |
| 7,557,781 B2 | 7/2009 | Chuang et al. | |
| 7,580,198 B2 | 8/2009 | Park et al. | |
| 7,632,002 B1* | 12/2009 | Park et al. | 362/616 |
| 7,871,836 B2 | 1/2011 | Yang et al. | |
| 8,092,064 B2* | 1/2012 | Erchak et al. | 362/613 |
| 8,109,644 B2* | 2/2012 | Bierhuizen | 362/97.3 |
| 8,388,212 B2* | 3/2013 | Baek et al. | 362/634 |
| 8,400,397 B2* | 3/2013 | Pijlman et al. | 345/102 |
| 8,403,511 B2* | 3/2013 | Bae et al. | 362/97.1 |
| 8,408,776 B2* | 4/2013 | Liu | 362/616 |
| 8,469,577 B2* | 6/2013 | Kang et al. | 362/616 |
| 2005/0001537 A1 | 1/2005 | West et al. | |
| 2007/0109779 A1* | 5/2007 | Sekiguchi et al. | 362/249 |
| 2007/0152135 A1* | 7/2007 | Watanabe et al. | 250/208.1 |
| 2007/0159849 A1* | 7/2007 | Sakai | 362/612 |
| 2007/0217200 A1 | 9/2007 | Yang et al. | |
| 2008/0112162 A1 | 5/2008 | Chan | |
| 2009/0086508 A1* | 4/2009 | Bierhuizen | 362/617 |
| 2009/0122227 A1* | 5/2009 | Hong et al. | 349/64 |
| 2010/0265275 A1* | 10/2010 | Pijlman et al. | 345/690 |
| 2011/0051397 A1* | 3/2011 | Bae et al. | 362/97.1 |
| 2011/0075398 A1 | 3/2011 | Wheatley et al. | |
| 2011/0157917 A1* | 6/2011 | Chang et al. | 362/613 |
| 2011/0221785 A1* | 9/2011 | Joung et al. | 345/690 |
| 2011/0286211 A1* | 11/2011 | Kubota | 362/231 |
| 2012/0075555 A1* | 3/2012 | Parker et al. | 349/62 |
| 2012/0113619 A1* | 5/2012 | Ho | 362/97.1 |
| 2012/0113620 A1* | 5/2012 | Ho et al. | 362/97.1 |
| 2012/0170252 A1* | 7/2012 | Liang et al. | 362/97.1 |
| 2012/0274875 A1* | 11/2012 | Sakita et al. | 349/62 |
| 2013/0027633 A1* | 1/2013 | Park et al. | 349/62 |
| 2013/0169905 A1* | 7/2013 | Ouchi et al. | 349/67 |

FOREIGN PATENT DOCUMENTS

| | | |
|---|---|---|
| JP | 2007-059618 | 3/2007 |
| TW | 200705046 | 2/2007 |

OTHER PUBLICATIONS

Huang et al., "Planar Lighting System Using Array of Blue LEDs to Excite Yellow Remote Phosphor Film", Journal of Display Technology, Jan. 2011, pp. 44~51, vol. 7, No. 1.

Salters et al., "Large, thin, flexible and low-cost light emitting surfaces", Proc. of SPIE, Aug. 27, 2007, pp. 1~8, vol. 6669.

Chang et al., "Enhancement of the optical performances for the LED backlight systems with a novel lens-cap", Proc. of SPIE, Aug. 15, 2006, pp. 1~6, vol. 6289.

Holcomb et al., "The LED Lightbulb: Are we there yet? Progress and Challenges for Solid State Illumination", Conference on Lasers and Electro-Optics, Jun. 6, 2003, pp. 1~4.

"Office Action of China Counterpart Application", issued on May 27, 2014, p. 1-p. 8.

* cited by examiner

PLANE LIGHT SOURCE AND FLEXIBLE PLANE LIGHT SOURCE

CROSS-REFERENCE TO RELATED APPLICATION

This application claims the priority benefit of U.S. provisional application No. 61/563,502 filed on Nov. 23, 2011 and Taiwan application serial no. 101113996, filed on Apr. 19, 2012. The Taiwan application claims the priority benefit of U.S. provisional application No. 61/563,502. The entirety of the above-mentioned patent applications is hereby incorporated by reference herein and made a part of specification.

TECHNICAL FIELD

The technical field relates to a light source, more particularly to, a plane light source.

BACKGROUND

Light-Emitting Diode (LED) with characteristics of high efficiency and long lifespan has been broadly applied in products, such as indicator box, illumination board, backlight module and advertising lamp board. Since the light-emitting diode is a point light source, conversion of the light-emitting diode into a plane light source rests in how to convert the point light source into a uniform planar light source. Mostly, the light-emitting diode is arranged in array to provide the required plane light source, for example, with a direct-type design or a side-type design. The light provided by the light-emitting diode that is arranged in array may be uniformed through stacking lens, light guide plate, diffusive film, brightness enhancement film (BEF), micro-lens film, and other optical films.

Generally, a small number of the light-emitting diodes are used in plane light source with the side-type design, and the light provided by the light-emitting diodes is converted into the plane light source through a light guide plate. Thickness of the plane light source with the side-type design is relatively thin. The plane light source with the side-type design is mainly applied to mobile phone, personal digital assistant (PDA), global positioning system (GPS), etc.

Generally, a large number of light-emitting diodes are used in plane light source with the direct-type design so as to provide an illumination area with a light utilization rate up to approximately 90%. The thickness of the plane light source with the direct-type design is thicker.

However, neither the plane light source with the side-type design nor the plane light source with the direct-type design has a characteristic of flexibility. Therefore, how to provide the plane light source with flexibility and favorable light-emitting uniformity is, in fact, a focus in the current stage of development.

SUMMARY

The disclosure provides a plane light source and a flexible plane light source with favorable light-emitting uniformity.

The disclosure provides a plane light source comprising a circuit substrate, a plurality of sets of side-view light-emitting devices, and a diffusive light-guiding layer. The side-view light-emitting devices are arranged in array over the circuit substrate and are electrically connected with the circuit substrate. The diffusive light-guiding layer covers the circuit substrate and the side-view light-emitting devices, wherein the diffusive light-guiding layer is divided into a plurality of diffusive light-guiding units arranged in array and connected to each other. Each of the diffusive light-guiding units is respectively corresponded to illumination coverage of one set of side-view light-emitting devices. Each set of side-view light-emitting devices at least comprises two side-view light-emitting devices. Light emitted from the two side-view light-emitting devices in each set of side-view light-emitting devices respectively propagates along two different directions into each of the corresponding diffusive light-guiding units. Each of the two side-view light-emitting devices is respectively emitting the light towards one single diffusive light-guiding unit.

The disclosure provides a flexible plane light source comprising a circuit substrate, a plurality of sets of side-view light-emitting devices, and a diffusive light-guiding layer. The side-view light-emitting devices are arranged in array over the circuit substrate and are electrically connected with the circuit substrate. The diffusive light-guiding layer covers the circuit substrate and the side-view light-emitting devices, wherein the diffusive light-guiding layer is divided into a plurality of diffusive light-guiding units arranged in array and connected to each other. Each of the diffusive light-guiding units is respectively corresponded to illumination coverage of one set of side-view light-emitting devices. Each set of side-view light-emitting devices at least comprises two side-view light-emitting devices. Light emitted from the two side-view light-emitting devices in each set of side-view light-emitting devices respectively propagates along two different directions into each of the corresponding diffusive light-guiding units. Each of the two side-view light-emitting devices is respectively emitting the light towards one single diffusive light-guiding unit. Furthermore, the circuit substrate comprises a flexible circuit substrate, and the diffusive light-guiding layer is possessed with flexibility.

The disclosure not only may produce a large size plane light source through splicing, but that the resulting plane light source also has favorable light-emitting uniformity during bending.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
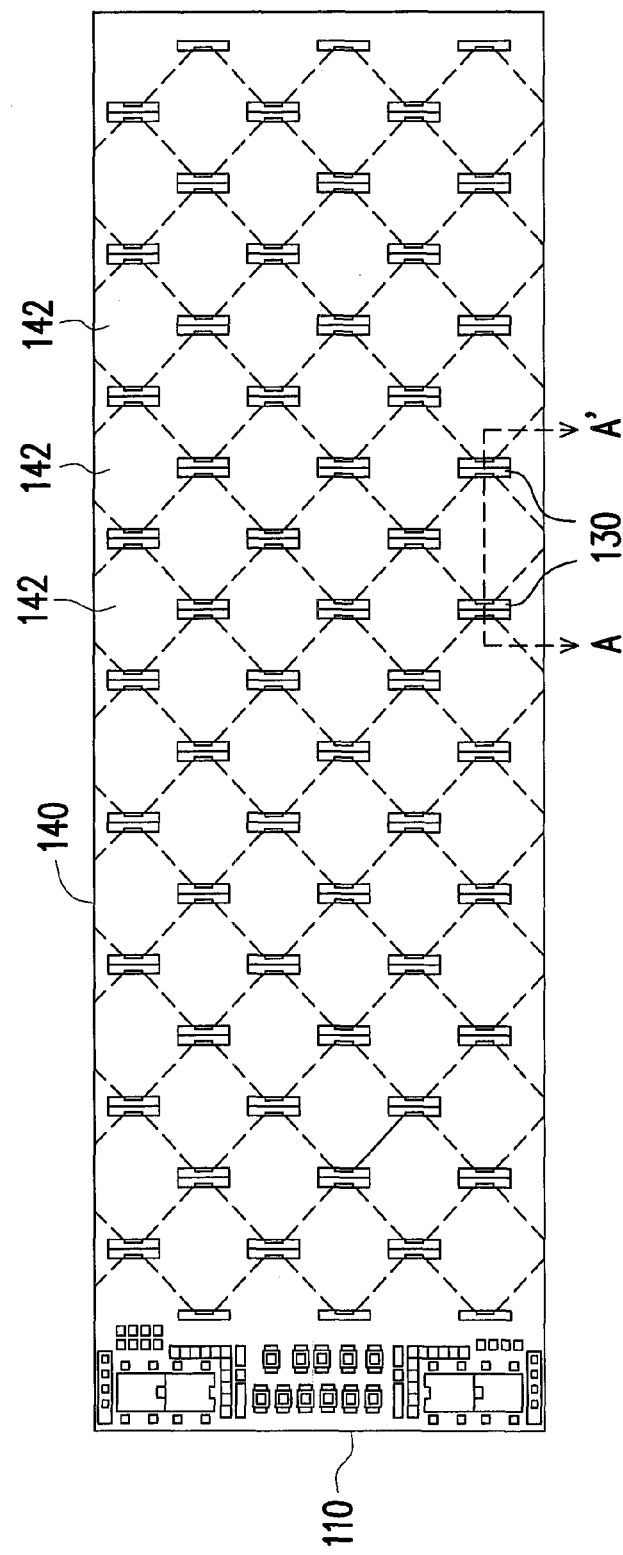
FIG. 1A is a top view schematic diagram illustrating a plane light source according to an exemplary embodiment.
Figure 1B:
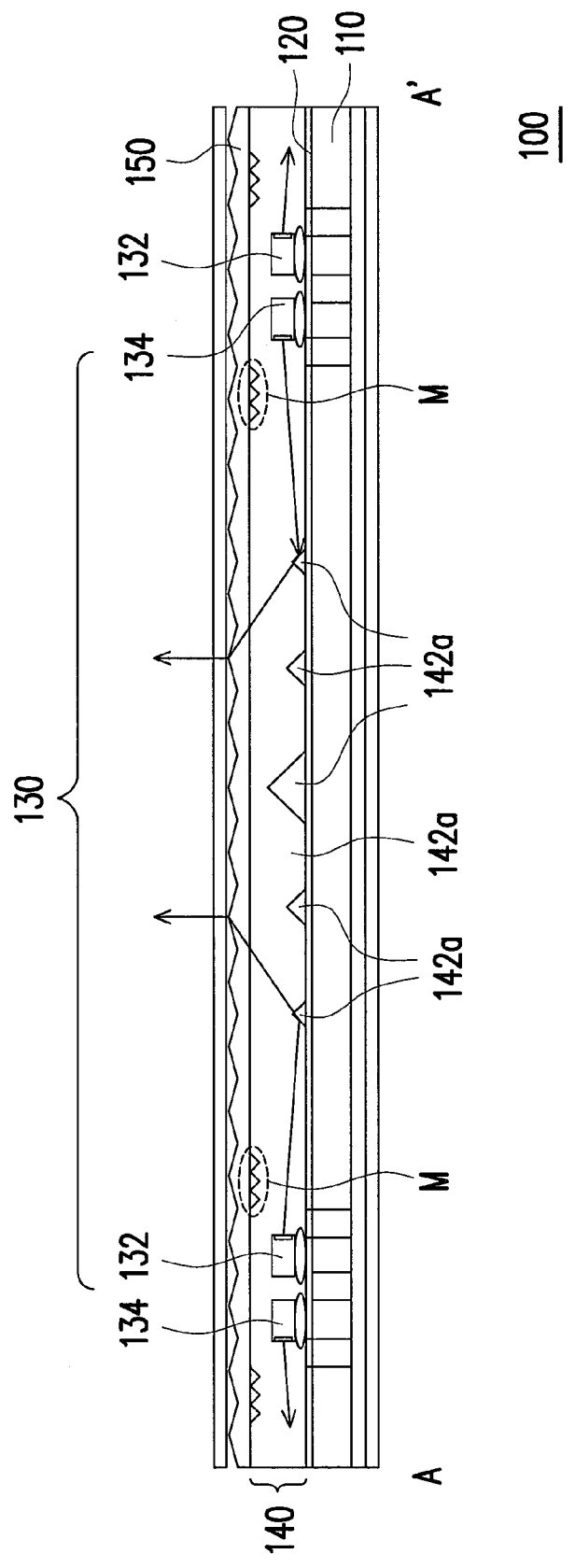
FIG. 1B is a cross-sectional schematic diagram illustrating the plane light source along a profile line A-A' in FIG. 1A.
Figure 1C:
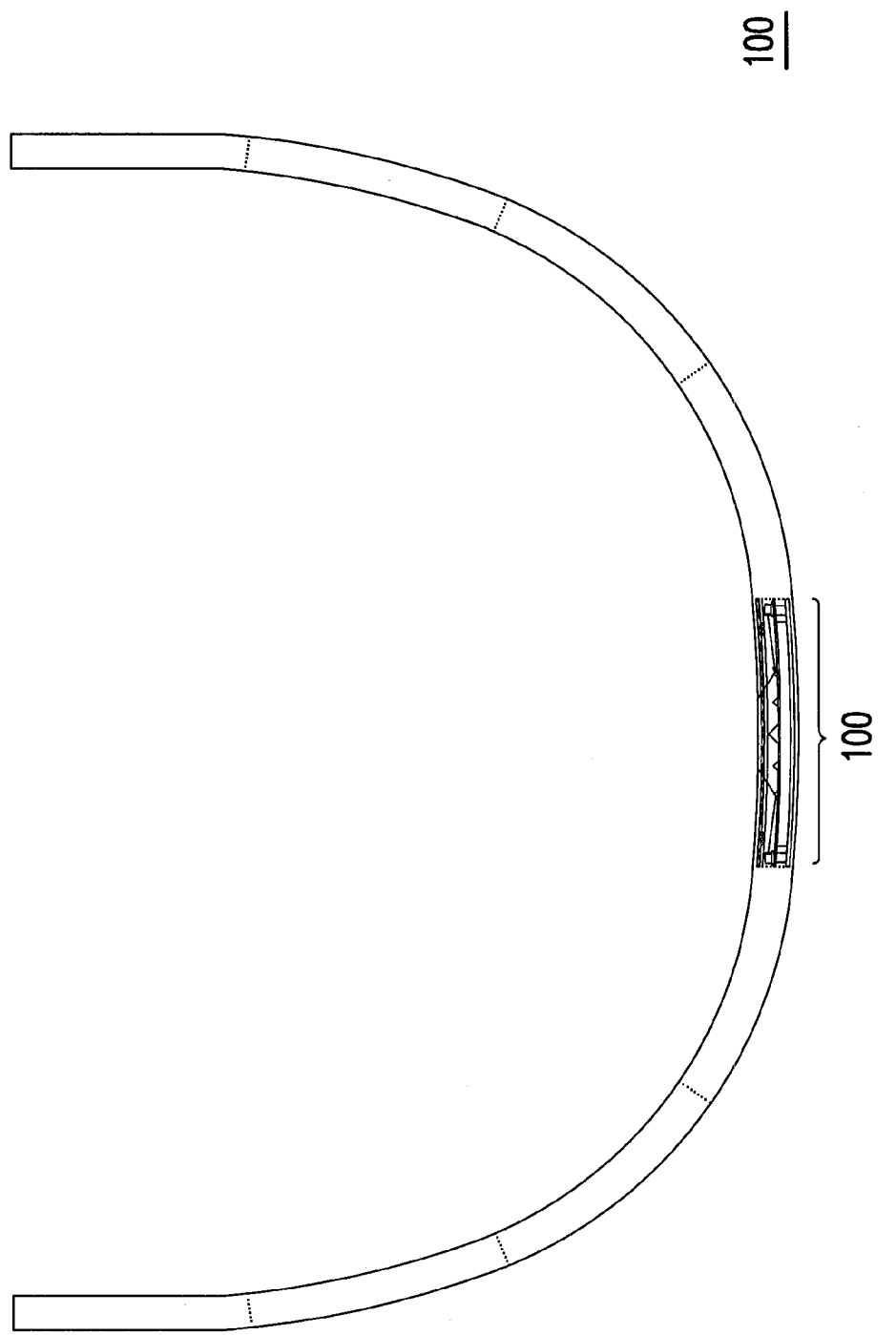
FIG. 1C is a cross-sectional schematic diagram illustrating the plane light source after being bended.

FIG. 1A is a top view schematic diagram illustrating a plane light source according to an exemplary embodiment, FIG. 1B is a cross-sectional schematic diagram illustrating the plane light source along a profile line A-A' in FIG. 1A, and FIG. 1C is a cross-sectional schematic diagram illustrating the plane light source after being bended. Referring to FIG. 1A, FIG. 1B and FIG. 1C, a plane light source 100 of the exemplary embodiment comprises a circuit substrate 110, a reflector 120, a plurality of sets of side-view light-emitting devices 130, a diffusive light-guiding layer 140, and at least one optical film 150. The reflector 120 is disposed over the circuit substrate 110. The sets of side-view light-emitting devices 130 are arranged in array over the circuit substrate 110 and are electrically connected with the circuit substrate. The diffusive light-guiding layer 140 covers the reflector 120 and the sets of side-view light-emitting devices 130, wherein the diffusive light-guiding layer 140 is divided into a plurality of diffusive light-guiding units arranged in array and connected to each other 142. Each of the diffusive light-guiding units 142 is respectively corresponded to illumination coverage of one set of side-view light-emitting devices 130. Each set of side-view light-emitting devices 130 at least comprises two side-view light-emitting devices 132,134. Light emitted from the two side-view light-emitting devices 132,134 respectively propagates along two different directions into each of the corresponding diffusive light-guiding units 142. Each of the two side-view light-emitting devices 132,134 is respectively emitting the light towards one single diffusive light-guiding unit 142. Furthermore, the optical film 150 is disposed over the diffusive light-guiding layer 140. In the present exemplary embodiment, the optical film 150 comprises a brightness enhancement film and/or a diffusive film.

It is noted that the reflector 120 and the optical film 150 are optional in this disclosure. One ordinary skilled in the art may omit the design of the reflector 120 and the optical film 150 based on actual design requirements. Specifically, when the reflector 120 is omitted, the diffusive light-guiding layer 140 covers the circuit substrate 110.

In an alternately embodiment, the diffusive light-guiding layer 140 may include a plurality of scattering particles (not shown) distributed therein.

As shown in FIG. 1B, each of the diffusive light-guiding units 142 includes at least one micro-structures M located on the top surface thereof However, the position and quantity of the micro-structures M are not limited in this disclosure. Additionally, the micro-structures M may be omitted according to actual design requirements.

It is noted that in FIG. 1B, the light emitted from the two side-view light-emitting devices 132, 134 is only illustrated for indication, and the light emitted from the two side-view light-emitting devices 132, 134 usually have a suitable divergence angle.

In the present exemplary embodiment, the circuit substrate 110 may be a flexible circuit substrate, and the reflector 120, the diffusive light-guiding layer 14 and the optical film 150 are all possessed with flexibility, as shown in FIG. 1C. Since the circuit substrate 110, the reflector 120, the diffusive light-guiding layer 140, and the optical film 150 are all posses with flexibility, the plane light source 100 of the present exemplary embodiment is also possessed with flexibility. In the other word, the plane light source 100 of the present exemplary embodiment may be bended in compliance with the environment or the shape of the object to be attached, and thus not limited by the environment or the shape of the object to be attached during installation.

In other exemplary embodiments, the circuit substrate 110 may also be a rigid circuit substrate. For example, the rigid circuit substrate may be a metal core printed circuit board (MCPCB), a FR-4 printed circuit board, a FR-5 printed circuit board, or other printed circuit board. When the circuit substrate 110 is the rigid circuit substrate, the choice of materials for the reflector 120, the diffusive light-guiding layer 140 and the optical film 150 are not limited to the flexible materials; therefore, the choice of materials are more diverse.

In the present exemplary embodiment, the reflector 120 may be a metal reflective coating, a metal reflective film, a white sheet, etc. In addition, the two side-view light-emitting devices 132, 134 disposed over the circuit substrate 110 may be, for example, service mounted device type light-emitting diode packages (SMD type LED packages), and the two side-view light-emitting devices 132,134 may also be, for example, side-view light-emitting diode packages. In the present exemplary embodiment, the two side-view light-emitting devices 132, 134 may laterally emit the light through the packaging type thereof, or may laterally emit the light through altering the light-emitting direction with an additional reflective cover. It is noted that the disclosure is not limited to the type of the two side-view light-emitting devices 132, 134, whereas any side-view light-emitting device capable of laterally emitting the light may be applied according to the present disclosure.

Figure 2A:
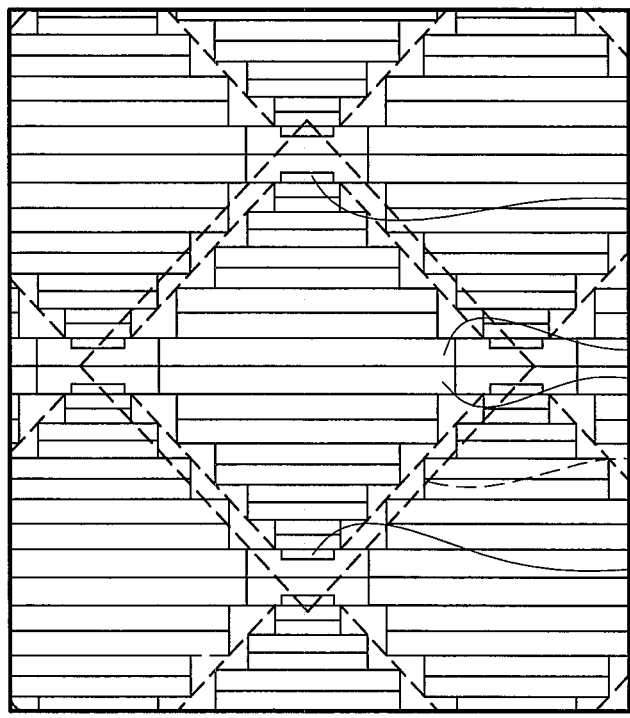
FIG. 2A is a top view schematic diagram illustrating a diffusive light-guiding layer according to the exemplary embodiment.
Figure 2B:
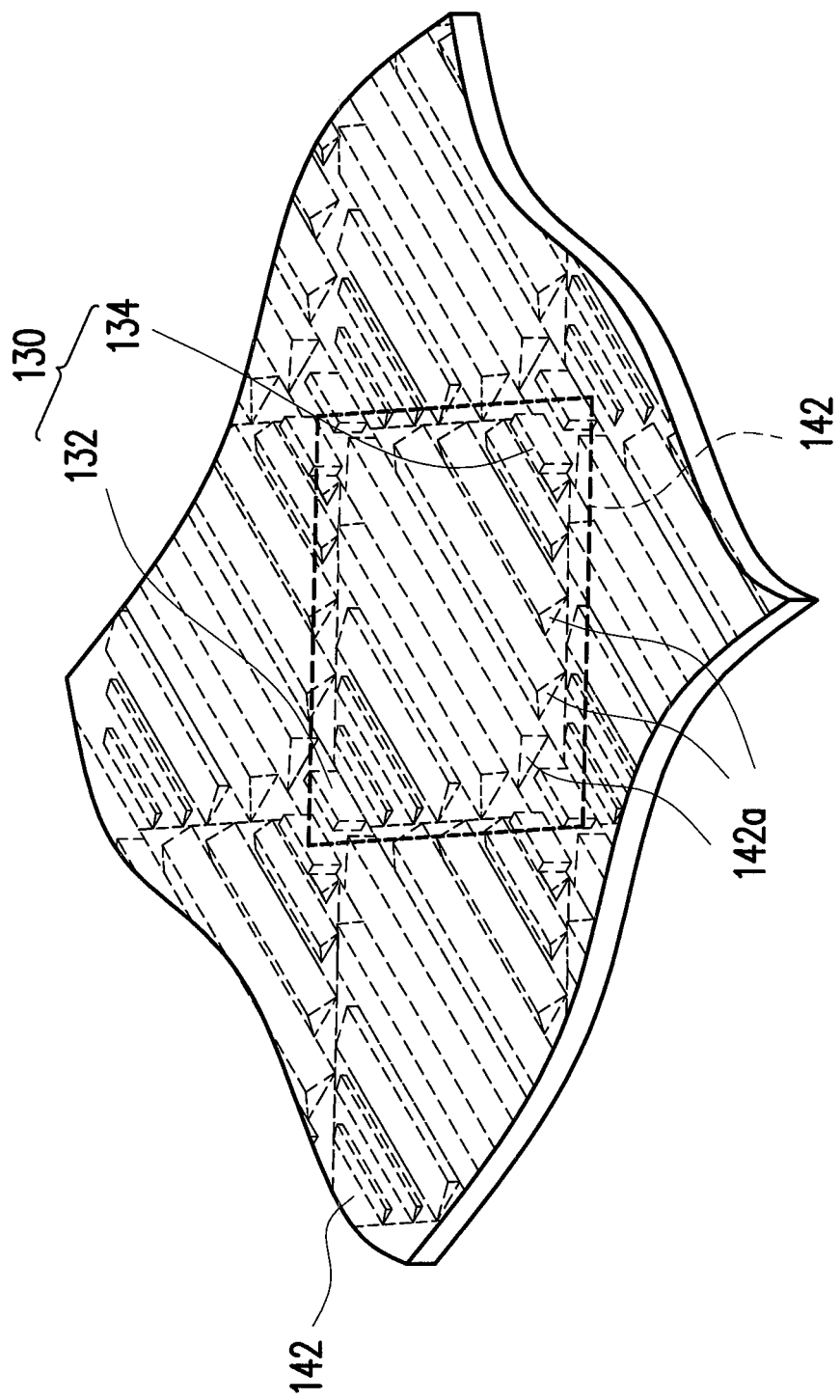
FIG. 2B is a three-dimensional perspective schematic diagram of the diffusive light-guiding layer according to an exemplary embodiment.

FIG. 2A is a top view schematic diagram illustrating a diffusive light-guiding layer according to an exemplary embodiment, and FIG. 2B is a three-dimensional perspective schematic diagram of the diffusive light-guiding layer according to the exemplary embodiment. Referring to FIG. 1A, FIG. 1B, FIG. 1C, FIG. 2A, and FIG. 2B, the diffusive light-guiding units 142 in the diffusive light-guiding layer 140 are integrally formed. For instance, the diffusive light-guiding layer 140 may be formed with injection molding. In the present exemplary embodiment, each of the diffusive light-guiding unit 142 is respectively a rhombic structure or a rectangular structure, and the two side-view light-emitting devices 132, 134 in each set of side-view light-emitting devices 130 are configured as corresponding to one set of opposite angles in the rhombic structure or the rectangular structure. More specifically, the side-view light-emitting device 132 and the side-view light-emitting device 134 in a same set of side-view light-emitting devices 130 are respectively emitting the light into one single diffusive light-guiding unit 142 along two opposite directions. Since the two side-view light-emitting devices 132, 134 in the same set of side-view light-emitting devices 130 have suitable divergence angles, illumination coverage provided by the side-view light-emitting device 132 and the side-view light-emitting device 134 is equivalent to distribution coverage of one single diffusive light-guiding unit 142. In the present exemplary embodiment, the divergence angles of the two side-view light-emitting devices 132, 134 is related to geometrical shape of the diffusive light-guiding units 142. One of ordinary skill in the art may determine the geometrical shape of each of the diffusive light-guiding units 142 according to the divergence angles of the two side-view light-emitting devices 132, 134; therefore, the disclosure is not limited to the divergence angles of the two side-view light-emitting devices 132, 134 and the geometrical shape of the diffusive light-guiding units 142.

As shown in FIG. 1B, FIG. 1C, FIG. 2A, and FIG. 2B, each of the diffusive light-guiding units 142 in the present exemplary embodiment respective has a plurality of diffusive micro-structures 142a, and the diffusive micro-structures 142a can enable the light, which is emitted from each set of the side-view light-emitting devices 130 into each of the diffusive light-guiding units 142, to be scattered. In the other word, the light after being scattered by the diffusive micro-structures 142a of each of the diffusive light-guiding units 142 is emitted from the top surface of each of the diffusive light-guiding units 142.

Figure 3A:
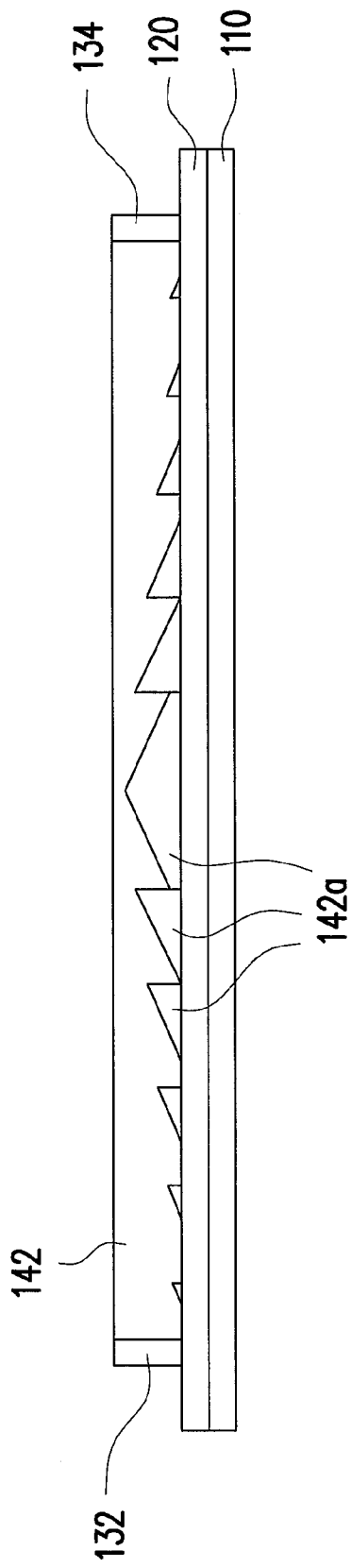
FIG. 3A and FIG. 3B are respectively the cross-sectional schematic diagrams illustrating two different diffusive light-guiding units according to an exemplary embodiment.
Figure 3B:
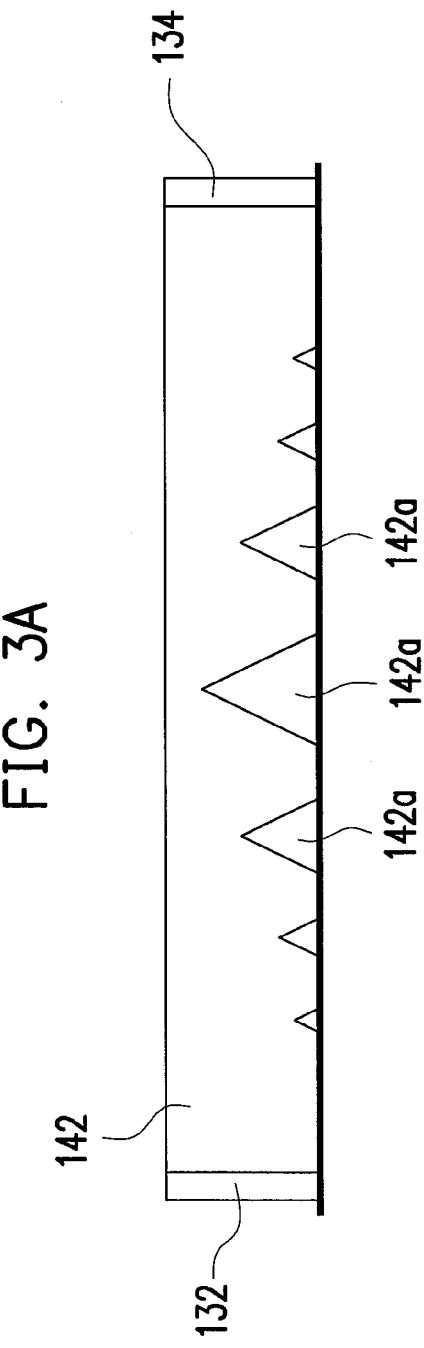

FIG. 3A and FIG. 3B are respectively the cross-sectional schematic diagrams illustrating two different diffusive light-guiding units according to an exemplary embodiment. Referring to FIG. 3A and FIG. 3B, in the present exemplary embodiment, the diffusive micro-structures 142a are strip-shaped grooves, and the size (height and width) of the diffusive micro-structures 142a gradually decreases from the center of the diffusive light-guiding units 142 towards the directions of the side-view light-emitting device 132 and the side-view light-emitting device 134. More specifically, a connection line between side-view light-emitting device 132 and the side-view light-emitting device 134 is substantially perpendicular to an extension direction of the diffusive micro-structures 142a (viz. strip-shaped grooves).

As shown in FIG. 3A, the diffusive micro-structures 142a are V-shaped grooves (V-grooves). The diffusive micro-structures 142a are arranged with equal spacing, and the height of the diffusive micro-structures 142a gradually decrease from the center towards two sides. For example, the spacing of the diffusive micro-structures 142a is 2 mm, and the height of the diffusive micro-structures 142a gradually decreases from 1.2 mm to 0.2 mm (viz. 1.2 mm, 1.0 mm, 0.8 mm, 0.6 mm, 0.4 mm, 0.2 mm).

As shown in FIG. 3B, the diffusive micro-structures 142a are V-shaped grooves (V-grooves). The diffusive micro-structures 142a are arranged with non-equal spacing, and the height of the diffusive micro-structures 142a gradually decreases from the center towards two sides. For example, the height of the diffusive micro-structures 142a gradually decreases from 0.7 mm to 0.1 mm (viz. 0.7 mm, 0.5 mm, 0.3 mm, 0.1 mm). Wherein, the spacing of two diffusive micro-structures 142a, which respectively have the heights of 0.7 mm and 0.5 mm, is 3.5 mm; the spacing of two diffusive micro-structures 142a, which respectively have the heights of 0.5 mm and 0.3 mm, is 2.5 mm; and the spacing of two diffusive micro-structures 142a, which respectively have the heights of 0.3 mm and 0.1 mm, is 2 mm.

In an alternative embodiment, the diffusive micro-structures 142a are, for example, semi-cylindrical grooves, and height of the diffusive micro-structures 142a gradually decreases from the center towards two sides. For instance, each of the semi-cylindrical grooves extends along a linear path or a curved path. In another alternative embodiment, the diffusive micro-structures 142a are, for example, semi-spherical grooves, and height of the diffusive micro-structures 142a gradually decreases from the center towards two sides.

Figure 4:
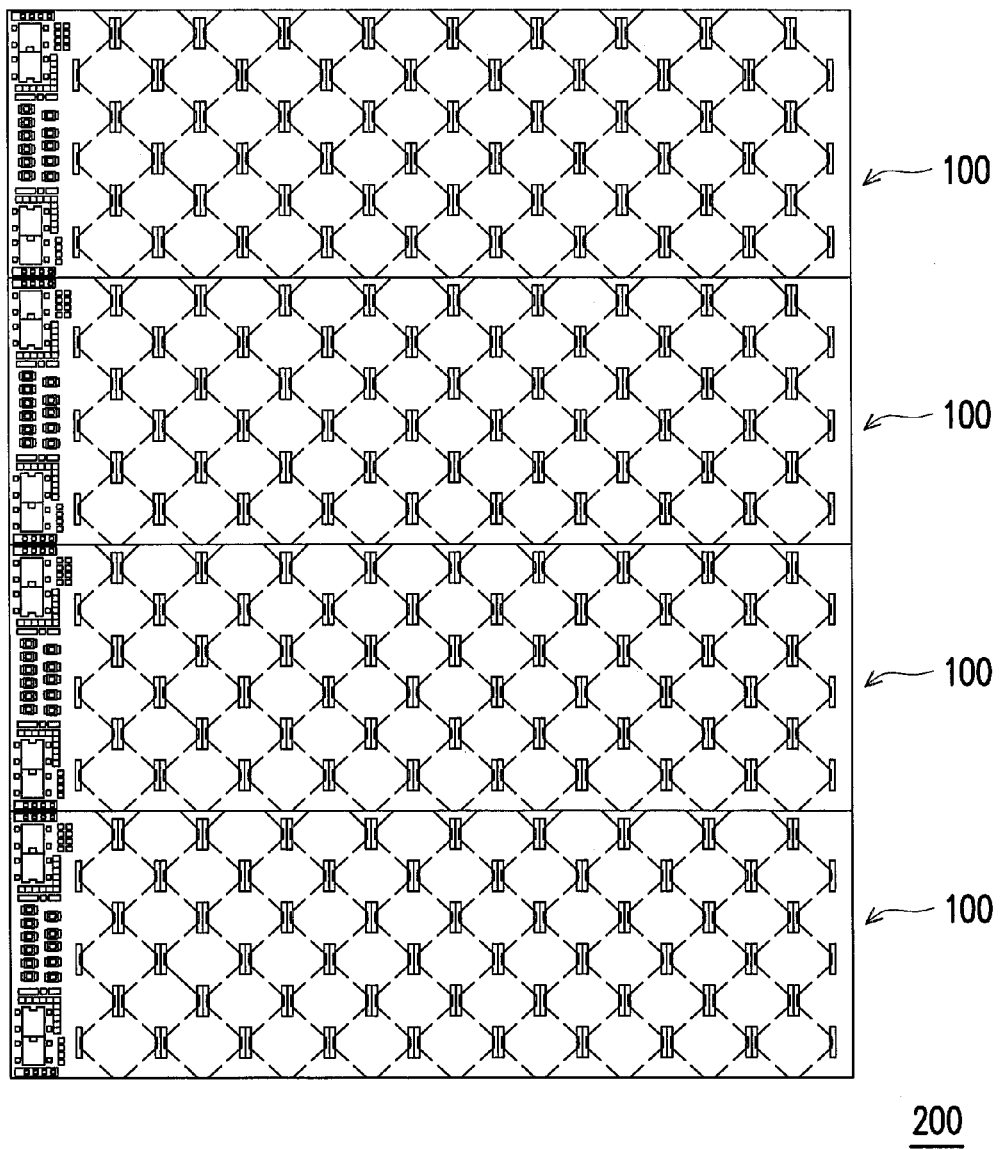
FIG. 4 is a schematic diagram illustrating a splicing type plane light source according to another exemplary embodiment.

FIG. 4 is a schematic diagram illustrating a splicing type plane light source according to another exemplary embodiment. Referring to FIG. 4, a splicing type plane light source 200 of the current embodiment comprises a plurality of plane light sources 100, wherein the plane light sources 100 are connected to each other in order constitute the splicing type plane light source 200 of larger area.

In the splicing type plane light source 200 of the current exemplary embodiment, the number of the plane light sources 100 and the arrangement of the plane light sources 100 may be varied according to the total area and the shape of the splicing type plane light source 200. The disclosure is not limited to the number of the plane light sources 100 and the arrangement of the plane light sources 100.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A plane light source comprising:
   a circuit substrate;
   a plurality of sets of side-view light-emitting devices arranged in array over the circuit substrate and electrically connected with the circuit substrate; and
   a diffusive light-guiding layer covering the circuit substrate and the side-view light-emitting devices, wherein the diffusive light-guiding layer is divided into a plurality of diffusive light-guiding units arranged in array and connected to each other, each of the diffusive light-guiding units is respectively corresponded to illumination coverage of one set of side-view light-emitting devices, each set of side-view light-emitting devices at least comprises two side-view light-emitting devices, wherein light emitted from the two side-view light-emitting devices in each set of side-view light-emitting devices respectively propagates along two different directions into each of the corresponding diffusive light-guiding units, and each of the two side-view light-emitting devices is respectively emitting the light towards one single diffusive light-guiding unit, wherein each diffusive light-guiding unit comprises a plurality of diffusive micro-structures, and the height and width of each successive diffusive micro-structure of the plurality of diffusive micro-structures gradually decrease from the center of the diffusive light-guiding unit towards the side-view light-emitting devices.

2. The plane light source as recited in claim 1, wherein the circuit substrate comprise a rigid circuit substrate.

3. The plane light source as recited in claim 1, wherein the diffusive light-guiding units in the diffusive light-guiding layer are integrally formed.

4. The plane light source as recited in claim 1, wherein each of the diffusive light-guiding units is a rhombic structure, and each set of side-view light-emitting devices is configured as corresponding to one set of opposite angles in the rhombic structure.

5. The plane light source as recited in claim 1, wherein each of the diffusive light-guiding units is a rectangular structure, and each set of side-view light-emitting devices is configured as corresponding to one set of opposite angles in the rectangular structure.

6. The plane light source as recited in claim 1, wherein the two side-view light-emitting devices in each set of side-view light-emitting devices are respectively emitting light along two opposite directions into the corresponding diffusive light-guiding unit.

7. The plane light source as recited in claim 1, wherein the diffusive micro-structures enable the light emitted from each set of the side-view light-emitting devices into each of the diffusive light-guiding units to be scattered.

8. The plane light source as recited in claim 1, further comprising an optical film disposed over the diffusive light-guiding layer.

9. The plane light source as recited in claim 8, wherein the optical film comprises a brightness enhancement film.

10. The plane light source as recited in claim 8, wherein the optical film comprises a diffusive film.

11. The plane light source as recited in claim 1, further comprising a reflector disposed over the circuit substrate, wherein the diffusive light-guiding layer covering the reflector.

12. The plane light source as recited in claim 1, further comprising a plurality of scattering particles distributed in the diffusive light-guiding layer.

13. A flexible plane light source comprising:
a circuit substrate;
a plurality of sets of side-view light-emitting devices arranged in array over the circuit substrate and electrically connected with the circuit substrate;
a diffusive light-guiding layer covering the circuit substrate and the side-view light-emitting devices, wherein the diffusive light-guiding layer is divided into a plurality of diffusive light-guiding units arranged in array and connected to each other, each of the diffusive light-guiding units is respectively corresponded to illumination coverage of one set of side-view light-emitting devices, each set of side-view light-emitting devices at least comprises two side-view light-emitting devices, wherein light emitted from the two side-view light-emitting devices in each set of side-view light-emitting devices respectively propagates along two different directions into each of the corresponding diffusive light-guiding units, and each of the two side-view light-emitting devices is respectively emitting the light towards one single diffusive light-guiding unit, wherein the circuit substrate comprises a flexible circuit substrate, and the diffusive light-guiding layer is possessed with flexibility, each diffusive light-guiding unit comprises a plurality of diffusive micro-structures, and the height and width of each successive diffusive micro-structure of the plurality of diffusive micro-structures gradually decrease from the center of the diffusive light-guiding unit towards the side-view light-emitting devices.

14. The flexible plane light source as recited in claim 13, wherein the diffusive light-guiding units in the diffusive light-guiding layer are integrally formed.

15. The flexible plane light source as recited in claim 13, wherein each of the diffusive light-guiding units is a rhombic structure, and each set of side-view light-emitting devices is configured as corresponding to one set of opposite angles in the rhombic structure.

16. The flexible plane light source as recited in claim 13, wherein each of the diffusive light-guiding units is a rectangular structure, and each set of side-view light-emitting devices is configured as corresponding to one set of opposite angles in the rectangular structure.

17. The flexible plane light source as recited in claim 13, wherein the two side-view light-emitting devices in each set of side-view light-emitting devices are respectively emitting light along two opposite directions into the corresponding diffusive light-guiding unit.

18. The flexible plane light source as recited in claim 13, wherein the diffusive micro-structures enable the light emitted from each set of the side-view light-emitting devices into each of the diffusive light-guiding units to be scattered.

19. The flexible plane light source as recited in claim 13, further comprising an optical film disposed over the diffusive light-guiding layer.

20. The flexible plane light source as recited in claim 19, wherein the optical film comprises a brightness enhancement film.

21. The flexible plane light source as recited in claim 19, wherein the optical film comprises a diffusive film.

22. The flexible plane light source as recited in claim 13, further comprising a reflector disposed over the circuit substrate, wherein the diffusive light-guiding layer covering the reflector.

23. The flexible plane light source as recited in claim 13, further comprising a plurality of scattering particles distributed in the diffusive light-guiding layer.

* * * * *